United States Patent [19]

Murasugi et al.

[11] Patent Number: 4,560,043
[45] Date of Patent: Dec. 24, 1985

[54] LOCKUP TORQUE CONVERTER HAVING SLIP CONTROL MEANS

[75] Inventors: Takashi Murasugi, Yokohama; Yoshiro Morimoto, Yokosuka; Masaaki Suga, Yokohama; Yasuhiro Niikura, Yokosuka, all of Japan

[73] Assignee: Nissan Motor Co., Ltd., Yokohama, Japan

[21] Appl. No.: 545,198

[22] Filed: Oct. 25, 1983

[30] Foreign Application Priority Data

Nov. 10, 1982 [JP] Japan .................. 57-196897

[51] Int. Cl.$^4$ .......................................... F16D 43/284
[52] U.S. Cl. ................................. 192/3.31; 192/0.076; 192/103 R
[58] Field of Search ............ 192/3.31, 3.3, 3.29, 192/3.28, 0.032, 0.033, 0.076, 103 R

[56] References Cited

U.S. PATENT DOCUMENTS

| 3,966,032 | 6/1976 | Koivunen | 192/3.3 |
| 4,002,228 | 1/1977 | Borman | 192/3.3 |
| 4,169,526 | 10/1979 | Malloy | 192/3.3 |
| 4,373,617 | 2/1983 | Mathues | 192/3.31 |

FOREIGN PATENT DOCUMENTS 2232326 2/1973 Fed. Rep. of Germany.
2619532 4/1977 Fed. Rep. of Germany.
2810497 10/1978 Fed. Rep. of Germany.
51-121661 10/1976 Japan.

Primary Examiner—George H. Krizmanich
Attorney, Agent, or Firm—Schwartz, Jeffery, Schwaab, Mack, Blumenthal & Evans

[57] ABSTRACT

A torque converter having an engine-driven pump impeller fastened to an input shell and a fluid-driven turbine runner mounted on an output shaft is equipped with a fluid-operated lockup clutch for providing a direct mechanical drive between the input shell and the output shell. The lockup clutch is maintained in a slipping engagement condition in an intermediate speed range. This slipping engagement is controlled by a variable fluid passage whose opening size is determined by an axial position of the turbine runner relative to the output shaft. The turbine runner is rotatable and axially movable relative to the output shaft. The turbine runner and the output shaft have, respectively, flanges which rotates side by side. There are formed, between the flanges, a plurality of pockets which are circumferentially arranged. Each pocket has contoured surfaces, and confines a ball. Each set of the ball and pocket is so formed as to control the opening size of the variable fluid passage by causing the turbine runner to move axially when the turbine runner rotate relative to the output shaft.

6 Claims, 13 Drawing Figures

LOCKUP TORQUE CONVERTER HAVING SLIP CONTROL MEANS

BACKGROUND OF THE INVENTION

The present invention relates to a lockup torque converter generally used in an automatic transmission.

A lockup torque converter has two operating modes. In one operating mode (torque conversion state), a vortex flow of oil impelled by an engine-driven torque converter input member (which is usually a pump impeller) drives an output member (which is usually a turbine runner) while multiplying torque under the reaction of a stator. In the other operating mode (lockup state), a lockup clutch is engaged to provide a direct mechanical driving connection between the input and output members. A lockup torque converter uses the torque conversion mode in a relatively low engine speed range in which engine torque fluctuation has a harmful influence, and there is a demand for multiplying torque. In a high engine speed range (a high vehicle speed range), a lockup torque converter uses the lockup mode and thereby eliminates slip between the input and output members. In this way, a lockup torque converter can improve fuel economy, as compared with a conventional torque converter which does not have the lockup mode and therefore suffers slippage at high speeds.

A lockup torque converter usually chooses one from these two operating modes depending upon whether the vehicle speed is higher than a predetermined vehicle speed called a lockup vehicle speed. This lockup vehicle speed is set at such a high vehicle speed that engine torque fluctuation becomes so low as not to cause vehicle body vibration. Therefore, a lockup torque converter having only these two operating modes can use the lockup mode only in a narrow range above such a high lockup speed, and its fuel economy advantage is not sufficient.

SUMMARY OF THE INVENTION

It is an object of the present invention to provide an improved lockup torque converter which has three operating modes, that is, a torque conversion mode for use in a low speed range, a lockup mode for use in a high speed range and a slip mode which is used in an intermediate speed range and in which the lockup clutch is slippingly engaged.

It is an object of the present invention to provide an improved lockup torque converter which has such three operating modes and can properly use these three operating modes in accordance with vehicle speed or engine speed.

According to the present invention, a lockup torque converter system comprises an input shell, an input member, an output member, output shaft means including an output shaft, a friction clutch, and fluid pressure regulating means. The input shell is adapted to be driven by a prime mover. The input member is secured to the input shell, and forms a closed fluid space with the input shell. The output member is disposed in the closed fluid space, and forms a fluid flow circuit with the input member so that driving torque can be transmitted from the input member to the output member by the dynamic action of a fluid intervening between the input and output members. The output member is mounted on the output shaft of the output shaft means. The friction clutch is disposed in the closed space between the input shell and the output shaft for providing a direct mechanical driving connection between the input shell and the output shaft. The friction clutch forms a lockup control chamber on one side between the input shell and the clutch, and a converter chamber on the other side of the clutch. The friction clutch is operated by a fluid pressure difference between both fluid chambers for making and breaking the direct mechanical driving connection. The fluid pressure regulating means is fluidly connected with the lockup control chamber and the converter chamber for regulating fluid pressures in the chambers. The lockup torque converter system according to the present invention further comprises control means, disposed between the output member and the output shaft means, for controlling a relative movement between the output member and the output shaft means. The output member is drivingly connected to the output shaft means through the control means. The output member is axially movable relative to the output shaft within a limited length. The output member has a pressure receiving portion having one side receiving a fluid pressure in the lockup control chamber and the other side receiving a fluid pressure in the converter chamber so that a force resulting from a fluid pressure difference between both chambers pushes the output member axially. The output member is rotatable relative to the output shaft means within a limited angle. The control means causes the output member to move axially relative to the output shaft when the output member rotates relative to the output shaft. The lockup control chamber is connected with the converter chamber by a fluid passage having a variable orifice which is formed between the output member and the output shaft means and capable of changing the opening size of the fluid passage when the output member moves relative to the output shaft.

DETAILED DESCRIPTION OF THE INVENTION

One embodiment of the present invention is shown in FIGS. 1 to 7.

Figure 1:
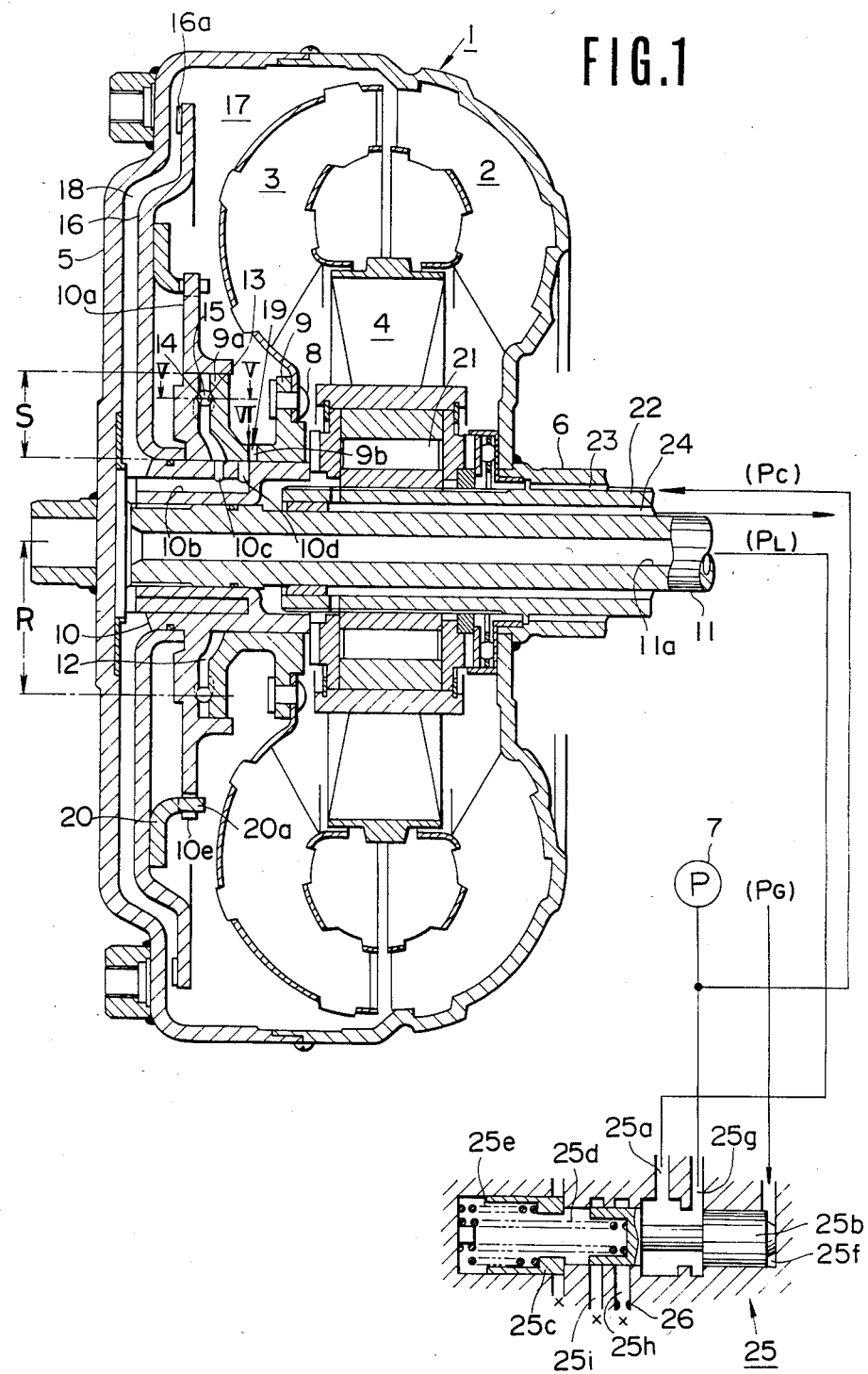
FIG. 1 is a longitudinal sectional side elevation of the lockup torque converter according to the present invention.

In FIG. 1, a torque converter 1 comprises a pump impeller (power input member) 2, a turbine runner (output member) 3 and a stator 4. The pump impeller 2 is drivingly connected with a crankshaft of an engine (not shown) through a converter cover (input shell) 5 which is welded to the pump impeller 2. Therefore, the pump impeller 2 is driven by the engine. A hollow pump driving shaft 6 is welded to the pump impeller 2, and a pump 7 is driven by the engine through the pump driving shaft 6.

The turbine runner 3 has a turbine hub 9 which is fastened to an inner circumference of the turbine runner 3 by rivets 8. The turbine runner 3 is slidably mounted on a sleeve 10 via the turbine hub 9. The sleeve 10 is splined to a torque converter output shaft 11 in such a manner that the sleeve 10 is axially immovable, so that the sleeve 10 is a part of the output shaft 11. The turbine hub 9 is integrally formed with an outward flange 9a. The sleeve 10 is integrally formed with an outward flange 10a. The outward flanges 9a and 10a extend vis-a-vis radially outwardly. One of the outward flanges 9a and 10a has a portion which fitly encloses the other of the flanges 9a and 10a. The outward flanges 9a and 10a forms a fluid pressure chamber 12 therebetween. The outward flanges 9a and 10a are slidable relative to each other. Between the outward flanges 9a and 10a, there are formed a plurality of pockets each containing a ball 15. Each pocket is formed by a ball recess 13 formed in the outward flange 9a, and a ball recess 14 formed in the outward flange 10a. The ball recesses 13 of each pocket is formed in the side of the outward flange 9a facing the outward flange 10a, and the ball recess 14 of each pocket is formed in the side of the outward flange 10a facing the outward flange 9a. The ball recesses 13 and 14 of each pocket face each other. The ball recesses 13 and 14 of each pocket extend circumferentially along an arc of a circle which is concentric with the torque converter output shaft 11 and has a radius R. The ball recesses 13 and 14 of each pocket have, respectively, bottoms 13a and 14a which are flat and parallel to each other. As shown in FIG. 5, the bottoms 13a and 14a of each pocket are inclined at an angle $\theta$ with respect to planes in which the outward flanges 9a and 10a rotate, respectively and which planes are parallel to each other. The ball 15 of each pocket is pressed between the bottoms 13a and 14a of the ball recesses 13 and 14 of that pocket. The ball 15, and the ball recess bottoms 13a and 14a of each pocket form a cam mechanism.

A lockup friction clutch 16 is slidably mounted on the sleeve 10. The lockup clutch 16 has a clutch facing 16a near the outside circumference. When the clutch facing 16a is pressed against the converter cover 5, there is formed, between the lockup clutch 16 and the converter cover 5, a lockup control chamber 18 which is isolated from a converter chamber 17. The lockup control chamber 18 is always in fluid communication with the pressure chamber 12 via at least one set of an axial passage 10b and a first radial passage 10c which are both formed in the sleeve 10. The lockup control chamber 18 is further in fluid communication with the converter chamber 17 via at least one set of the axial passage 10b of the sleeve 10, a second radial passage 10d formed in the sleeve 10 and a slit 9b formed in the turbine hub 9. The slit 9b and the second radial passage 10d form a variable orifice 19. The variable orifice 19 may take the form of FIG. 6A or the form of FIG. 6B. In the case of FIG. 6A, the slit 9b is axially elongated, and the radial passage 10d is circular. In the case of FIG. 6B, the slit 9b is circumferentially elongated, and the radial passage 10d is rectangular or square. In either case, the opening size of the variable orifice 19 is determined by the overlap of the slit 9b and the radial passage 10, as shown by hatchings in FIGS. 6A and 6B. The area of this overlap varies when the slit 9b moves axially and circumferentially relative to the radial slot 10d as shown by arrows of a solid line and a broken line in FIGS. 6A and 6B. The variable orifice 19 controls fluid flow between the converter chamber 17 and the lockup control chamber 18 by changing its opening size. It is optional to form an orifice in the first radial passage 10c with the intention of improving stability in feeding back fluid pressure in the lockup control chamber 18 to the pressure chamber 12, and preventing hunting in step response.

The lockup clutch 16 has an annular member 20 which has a L shaped section and is fixed to the lockup clutch 16. Teeth 20a formed in the annular member 20 round its free edge engage with teeth 10e formed in the sleeve flange 10a round its outer edge. Thus, the lockup clutch 16 is drivingly connected with the sleeve 10 in such a manner that the lockup clutch 16 is axially movable relative to the sleeve 10.

The stator 4 of the torque converter 1 is mounted on a hollow stationary shaft 22 via a one-way clutch 21. There are formed an annular passage 23 between the pump driving shaft 6 and the stationary shaft 22, and an annular passage 24 between the stationary shaft 22 and the torque converter output shaft 11. The annular passage 23 introduces an operating oil from the oil pump 7 into the torque converter 1, and the annular passage 24 conveys the operating oil out of the torque converter. A fluid pressure $P_C$ within the torque converter 1, that is, within the converter chamber 17, is maintained constant by such means as a pressure regulating valve disposed in an oil passage.

The lockup control chamber 18 is in fluid communication, via a central axial passage 11a of the torque converter output shaft 11, with an output control port 25a of a lockup control valve 25. The lockup control valve 25 has a spool 25b a plug 25c, springs 25d and 25e biasing the spool 25b and the plug 25c, respectively, toward the right, as viewed in FIG. 1. A governor pressure Pg proportional to vehicle speed is introduced to a chamber 25f of the lockup control valve 25. In accordance with the governor pressure Pg in the chamber 25f, the spool 25b moves and fluidly connects the output port 25a with an inlet port 25g, a drain port 25h having a fixed orifice 26 and a drain port 25i in a selective manner. Into the inlet port 25g, the converter chamber pressure $P_C$ is introduced.

Figure 7:
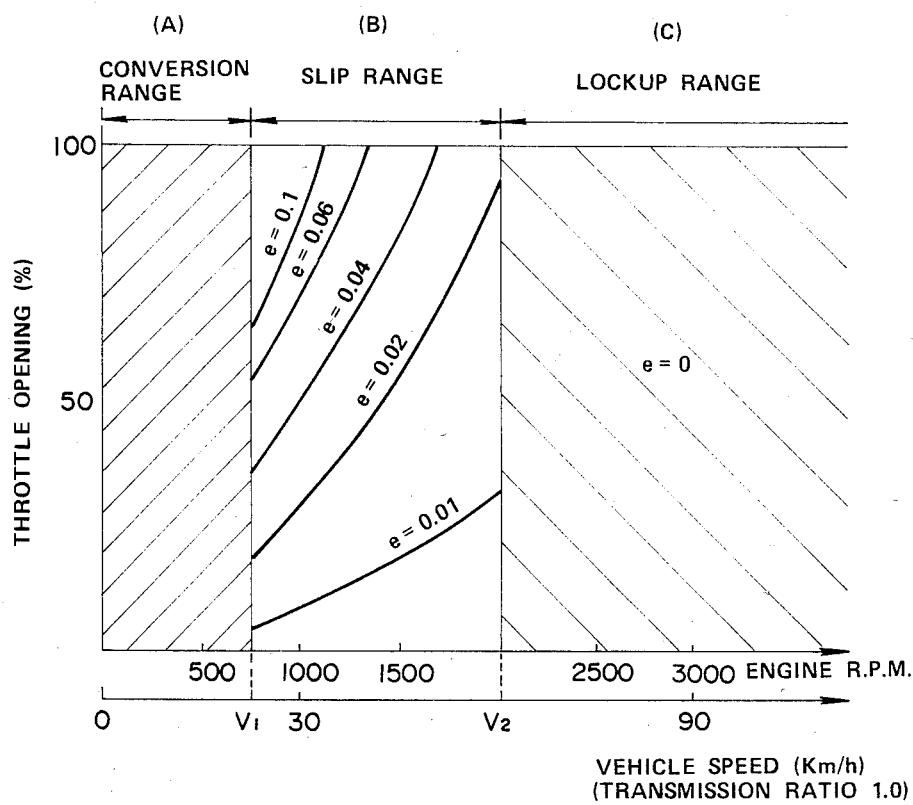
FIG. 7 is a diagram for showing the slip rate change of the lockup torque converter of the present invention.

The lockup torque converter having the thus constructed slip control system is operated as follows:

In a torque conversion range A in which vehicle speed is equal to or lower than $V_1$ as shown in FIG. 7, the vehicle speed dependent governor pressure Pg is low, so that the governor pressure Pg can not cause the spool 25b to move against the spring 25d. In this example, the vehicle speed $V_1$ is 20 km/h. In this torque conversion range A, the lockup control valve 25 is in the state shown in FIGS. 1 and 3, in which the torque converter chamber pressure $P_C$ is supplied to the lockup control chamber 18 through the inlet port 25g, the output port 25a and the central axial passage 11a. Therefore, the fluid pressure in the lockup control chamber 18 is equal to the fluid pressure in the converter chamber 17, and the lockup clutch 16 is maintained disengaged as shown in FIG. 1. Thus, the lockup torque converter is operated in a torque conversion mode. In this torque conversion mode, the engine-driven impeller 2 directs the operating oil to the turbine runner 3, and the oil returns through the stator 4 to the impeller 2. During this, the operating oil drives the turbine runner 3 and multiplies torque under the reaction of the stator. Then, power is transmitted through the turbine hub 9, the balls 15 and the sleeve 10, and power is obtainable at the torque converter output shaft 11.

Figure 4:
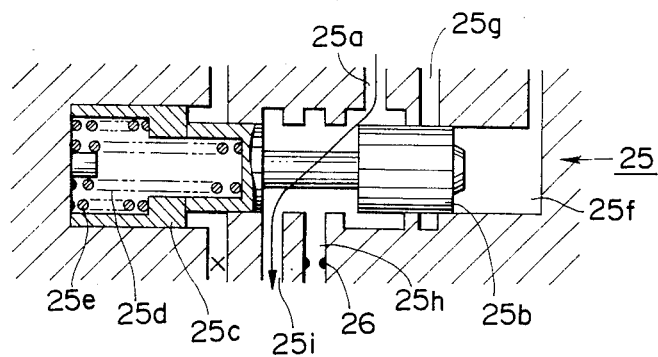

In a lockup range C in which vehicle speed is equal to or higher than $V_2$ (60 km/h, by way of example) as shown in FIG. 7, the high governor pressure Pg corresponding to a high vehicle speed moves the spool 25b against not only the spring 25d but also the spring 25e, so that the lockup control valve 25 is brought into the state shown in FIG. 4. In this state, the lockup control chamber 18 is in fluid communication with the drain ports 25h and 25i the central axial passage 11a and the output port 25a, so that the lockup control chamber 18 is maintained in a no-pressure or a low pressure state. Therefore, the converter chamber pressure $P_C$ pushes the lockup clutch 16 leftward as viewed in FIG. 1, and presses the clutch facing 16a against the converter cover 5. Thus, the lockup torque converter is operated in a lockup mode in which the lockup clutch is in clutch engagement. In this lockup mode, engine torque is directly transmitted to the torque converter output shaft 11 through the lockup clutch 16, the annular member 20 and the sleeve 10 without using the hydrodynamic drive. Therefore, the slip rate of the torque converter is equal to zero in this lockup mode.

Figure 2:
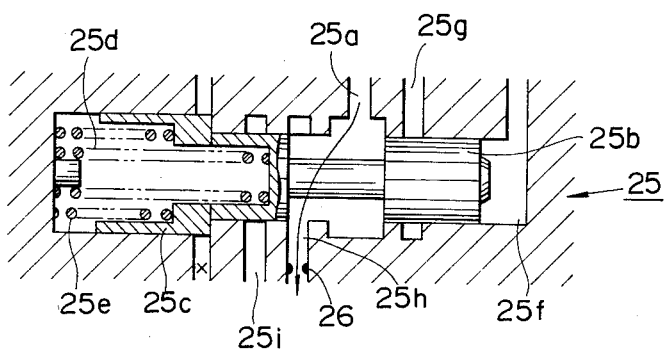
FIGS. 2 to 4 are sectional views of a lockup control valve shown in FIG. 1, for illustrating its operating states.
Figure 3:
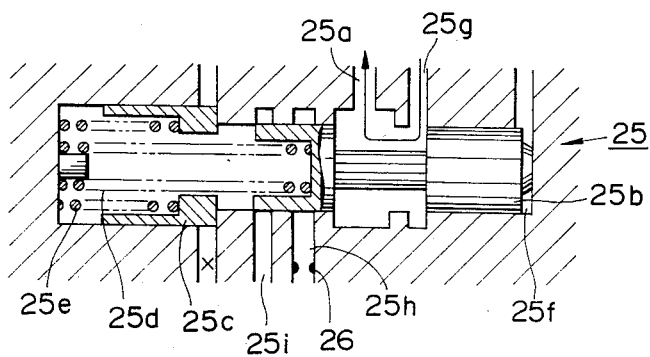

In a slip range B of FIG. 7 in which range vehicle speed is between $V_1$ and $V_2$, the vehicle speed dependent governor pressure Pg brings the lockup control valve 25 in the state shown in FIG. 2. In this state, a lockup control chamber pressure $P_L$ in the lockup control chamber 18 is drained through the fixed orifice 26, on one hand. On the other hand, the converter chamber pressure $P_C$ is supplied from the converter chamber 17 to the lockup control chamber 18 through the variable orifice 19. Thus, the fluid pressure $P_L$ of the lockup control chamber 18 is determined by the opening degree of the variable orifice 19. The lockup clutch 16 is slippingly engaged with the converter cover 5 with a clutch engagement force which varies in accordance with the lockup control chamber pressure $P_L$. In this slip mode, torque is transmitted in an intermediate state between the torque conversion mode and the lockup mode.

Figure 5A:
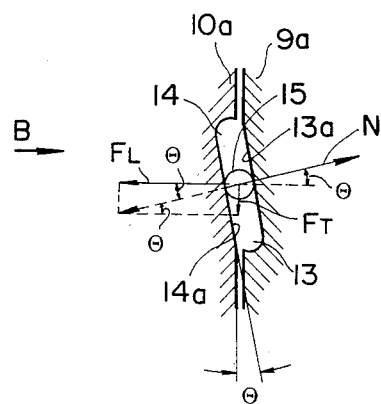
FIG. 5A is a view of a ball and a ball pocket shown in FIG. 1, as it would appear if cut through by a cylindrical intersecting plane coaxial with the torque converter and developed on a flat plane tangent to the cylindrical plane along a line V—V of FIG. 1.
Figure 5B:
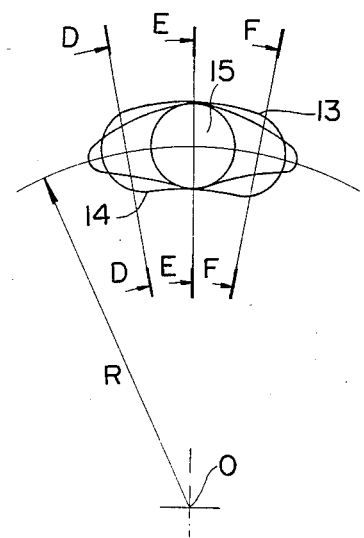
FIG. 5B is a view of the ball and ball pocket as viewed in a direction B of FIG. 5A.
Figure 5C:
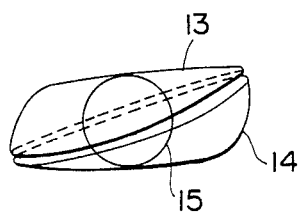
FIG. 5C is a perspective view of the ball and ball pocket.
Figure 5D:
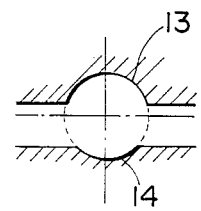
FIGS. 5D, 5E and 5F are sectional views taken along lines D—D, E—E and F—F of FIG. 5B, respectively.
Figure 5E:
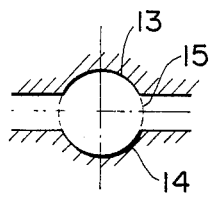
Figure 5F:
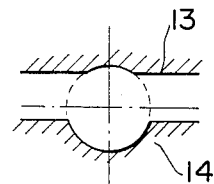
Figure 6:
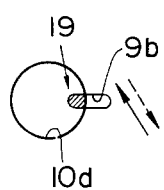
FIG. 6A is a fragmentary view as viewed in a direction VI of FIG. 1, showing one example of a variable orifice.
FIG. 6B is a fragmentary view similar to FIG. 6A, showing another example of the variable orifice.
Figure 6:
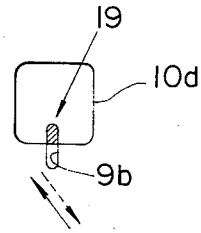

The turbine hub 9 receives a force $F_T$ due to a torque $T_T$ exerted on the turbine runner 3, and a force $F_L$ caused by a fluid pressure difference between the converter chamber pressure $P_C$ and the lockup control chamber pressure $P_L$, acting on an effective area of the turbine hub 9 within the pressure chamber 12. A frictional force produced between the turbine hub 9 and the ball 15 is negligible. The resultant of the force $F_T$ and the force $F_L$ is in balance with a reaction force N of the ball 15, as shown in FIG. 5A. The forces $F_T$ and $F_L$ are given by; $F_T = T_T/R$ ... (1), and $F_L = (P_C - P_L)S$ ... (2), respectively. In the equilibrium state, the force $F_T$ is equal to $N \cdot \sin \theta$, and the force $F_L$ is equal to $N \cdot \cos \theta$. Therefore, the following equation is obtained; $F_L \cdot \tan \theta = F_T$ ... (3). A torque $T_L$ transmitted through the lockup clutch 16 is given by $T_L = K(P_C - P_L)$ ... (4), where K is a constant determined by the effective area and the radius of the lockup clutch 16. From the equations (1) to (4), we can obtain $$T_L \times \frac{S}{K} \tan\theta = \frac{T_T}{R}.$$

Therefore, the relation between the torques $T_L$ and $T_T$ is written as $$T_L = \frac{K}{S} \times \frac{1}{R \tan\theta} \times T_T.$$

The quantity $$\frac{K}{S} \times \frac{1}{R \tan\theta}$$

is a constant because all of the quantities K, S, R and $\theta$ have fixed values. Thus, the following equation is obtained;

$$T_L = k \times T_T \tag{5}$$

where $$k = \frac{K}{S} \times \frac{1}{R \tan\theta} = \text{constant}.$$

That is, the clutch torque $T_L$ is proportional to the turbine torque $T_T$.

If the turbine torque $T_T$ increases, the turbine hub flange 9a rotates relative to the sleeve flange 10a so that the turbine hub flange 9a moves downward relative to the sleeve flange 10a, as viewed in FIG. 5A. In this case, the ball recess bottoms 13a and 14a, and the ball 15 of each pocket act as a cam mechanism, and the turbine hub 9 is axially shifted rightward in FIG. 5A. This axial rightward movement of the turbine hub 9 causes the slit 9b to move rightward and downward as shown by the broken line arrows in FIGS. 6A and 6B, and decreases the opening degree of the variable orifice 19, so that less fluid pressure is admitted from the converter chamber 17 to the lockup control chamber 18. Therefore, the fluid pressure in the lockup control chamber 18 is decreased so as to reestablish the relation of the equation (5), because the pressure is drained through the fixed orifice 26 at a constant rate.

If the turbine torque $T_T$ decreases, the turbine hub 9 rotates relative to the output shaft 11 so that the turbine hub sleeve 9a moves upward in FIG. 5A. Accordingly, the turbine hub 9 is shifted leftward in FIG. 5A, and this causes the slit 9b to move leftward and upward as shown by the solid line arrows in FIGS. 6A and 6B. Thus, the opening degree of the variable orifice 19 is increased, so that more pressure is admitted from the converter chamber 17 to the lockup control chamber 18 through the variable orifice 19. As a result, the fluid pressure in the lockup control chamber 18 is increased until the relation of the equation 5 is established again. In this slip control, the balls 15 moves axially of the torque converter, so that undesired influence exerted by a centrifugal force on the control is minimized.

Thus, in the slip range B of FIG. 7, this system can control the fluid pressure in the lockup control chamber 18 by controlling the opening degree of the variable orifice 19 in accordance with a change of the turbine torque $T_T$. Thus, this system increases and decreases the slipping clutch engagement force of the lockup clutch 16, and achieves such a slip control of the lockup torque converter as to maintain the constant ratio between the turbine torque $T_T$ and the clutch torque Tl as expressed by the equation (5). In the slip range B, the slip rate e of the torque converter varies continuously as shown in FIG. 7 by way of example. In this example, the lockup torque converter is so designed that k is equal to 1/9. The values 0.1, 0.06 etc. of the slip rate e shown in FIG. 7 are representative values. Thus, the slip rate can be controlled at a proper value adapted to the engine operating condition.

The slip control system of the present invention employs the cam mechanism which moves axially of the torque converter for controlling the opening degree of the variable orifice, as explained above. Therefore, this slip control system can prevent disturbance in the control system, due to the action of a centrifugal force within the slip range B while this slip control system has a simple and uncostly mechanical construction. Thus this control system can control the slipping engagement of the lockup clutch 16 so as to maintain the constant ratio between turbine torque $T_T$ and the clutch torque Tl with high accuracy. Accordingly, the lockup torque converter according to the present invention can minimize torque converter slip while absorbing torque fluctuation, and satisfy both of two conflicting requirements of preventing vibration and improving fuel economy, in a reliable manner. Moreover, the slip control system of the present invention can control the slip rate e of the torque converter always at a value adapted to the engine operating condition, as shown in FIG. 7, so that the above-mentioned two conflicting requirements can be satisfied remarkably.

As shown in FIG. 1, the lockup control valve according to the present invention has the fixed orifice for draining the fluid pressure in the lockup control chamber in the predetermined vehicle speed range, so that the lockup torque converter can be operated very effectively in three operating modes. That is, in the low engine speed range A of FIG. 7, in which engine torque is so low that there is a demand for multiplying torque, and at the same time torque fluctuation is so large that there is a demand for absorbing torque fluctuation, the lockup torque converter is operated in such a torque conversion mode as to satisfy the above mentioned demands of the low engine speed range. In the high engine speed range C of FIG. 7, in which torque fluctuation is small, and there is no need for torque multiplication, the lockup torque converter is put in the lockup mode to eliminate slip of the torque converter, and improve fuel economy. In the intermediate engine speed range B, in which engine torque is sufficient in comparison, but torque fluctuation still tend to cause trouble, the lockup clutch 16 is slippingly engaged so as to absorb engine torque fluctuation and at the same time to restrain slip of the torque converter as much as possible. In this way, the lockup torque converter can be operated effectively.

What is claimed is:

1. A lockup torque converter system comprising;
   an input shell adapted to be driven by a prime mover,
   an input member which is secured to said input shell and forms a closed fluid space with said input shell,
   an output member which is disposed in said closed fluid space and forms a fluid flow circuit with said input member so that driving torque can be transmitted from said input member to said output member by the dynamic action of a fluid intervening between said input and output members,
   an output shaft on which said output member is mounted,
   a friction clutch, disposed in said closed space between said input shell and said output shaft, for providing a direct mechanical driving connection between said input shell and said output shaft, said friction clutch forming a lockup control chamber on one side between said input shell and said clutch and a converter chamber on the other side of said clutch, said clutch being operated by a fluid pressure difference between both fluid chambers for making and breaking the direct mechanical driving connection,
   fluid pressure regulating means, fluidly connected with said lockup control chamber and said converter chamber, for regulating fluid pressures in said chambers, and
   control means, disposed between said output member and said output shaft, for controlling a relative movement between said output member and said output shaft means, said output member being drivingly connected to said output shaft through said control means, said output member being axially movable relative to said output shaft within a limited length, said output member having a pressure-receiving portion having one side receiving a fluid pressure in said lockup control chamber and the other side receiving a fluid pressure in said converter chamber so that a force resulting from a fluid pressure difference between both chambers pushes said output member axially, said output member being rotatable relative to said output shaft within a limited angle, said control means causing said output member to move axially relative to said output shaft when said output member rotates relative to said output shaft, said lockup control chamber being connected with said converter chamber through a variable orifice which is formed between said output member and said output shaft means and capable of changing the opening size of said fluid passage when said output member moves relative to said output shaft.

2. A lockup torque converter system according to claim 1, wherein said control means allows said output member to rotate relative to said output shaft in accordance with a difference between a torque exerted on said output member and a torque transmitted through said friction clutch.

3. A lockup torque converter system according to claim 2, wherein said fluid pressure receiving portion of said output member surrounds said output shaft and projects radially outwardly, and said output shaft has an outward flange portion which projects radially outwardly around said output shaft, faces said pressure receiving portion of said output member, and forms a fluid pressure chamber between said pressure receiving portion of said output member and said outward flange portion, said pressure chamber being in fluid communication with said lockup control chamber, and wherein said control means is a plurality of balls each of which is confined in a pocket formed between said outward flange portion of said output shaft and said pressure receiving portion of said output member within said pressure chamber, each of said pockets being formed by a first recess formed in said pressure receiving portion of said output member and a second recess formed in said outward flange portion of said output shaft, said first and second recesses of each pocket extending circumferentially along an arc of a circle concentric with said output shaft, said first and second recesses of each pocket having, respectively, first and second bottoms which are parallel with each other, and inclined at a predetermined angle with respect to a plane perpendicular to said output shaft, said ball of each pocket causing said output member to move axially when said first recess of that pocket rotates relative to said second recess of that pocket so that said ball remains in contact with said first and second bottoms of said first and second recesses.

4. A lockup torque converter system according to claim 3, wherein said variable orifice comprises a slit formed in said output member and a radial hole formed in said output shaft, the opening degree of said fluid passage being determined by an overlap between said slit and said radial hole, said overlap being changed when said output chamber moves relative to said output shaft.

5. A lockup torque converter system according to claim 4, wherein said output shaft has an axial fluid passage leading from said lockup control chamber to said variable orifice, and a second radial hole leading from said axial passage to said pressure chamber.

6. A lockup torque converter system according to claim 5, wherein said fluid pressure regulating means comprises constant fluid pressure supplying means for supplying a constant fluid pressure to said converter chamber, variable fluid pressure supplying means for supplying a variable fluid pressure, and a lockup control valve having a spool and biasing means for biasing said spool in a first axial direction, said spool receiving, on one end, the fluid pressure supplied by said variable fluid pressure supplying means so that said spool is pushed in a second axial direction opposite to said first axial direction, said biasing means maintaining said spool in a first axial position when said variable fluid pressure is below a first predetermined value, in a second axial position when said variable fluid pressure is between said first predetermined value and a second predetermined value higher than said first predetermined value, and in a third axial position when said variable fluid pressure is above said second predetermined value, said lockup control valve having an inlet port which is supplied with the constant fluid pressure of said constant fluid pressure supplying means, a control port communicating with said lockup control chamber, and first and second drain ports for removing the fluid pressure in said lockup control chamber, said first drain port having a fixed orifice, said spool closing said first and second drain ports and communicating said control port with said inlet port when said spool is in said first axial position, said spool closing said inlet port and said second drain port and communicating said control port with said first drain port when said spool is in said second axial position, said spool closing said inlet port and communicating said control port with said second drain port when said spool is in said third axial position.

* * * * *